(No Model.) 2 Sheets—Sheet 2.
E. THOMSON.
SYSTEM OF ELECTRICAL DISTRIBUTION.
No. 508,646. Patented Nov. 14, 1893.
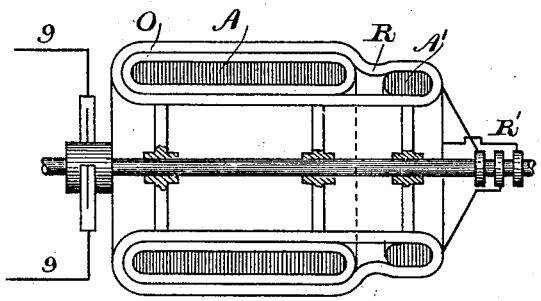
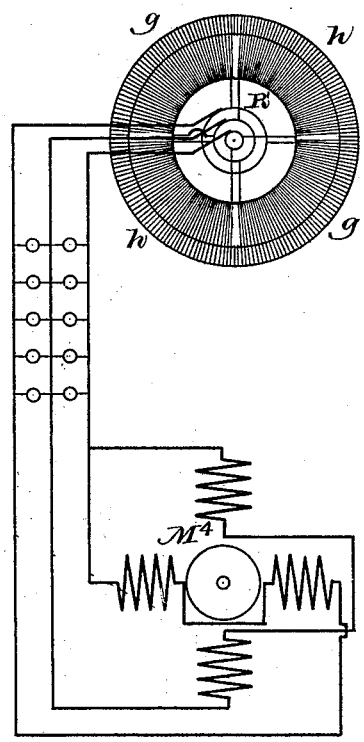
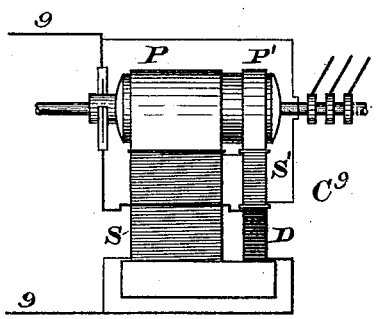
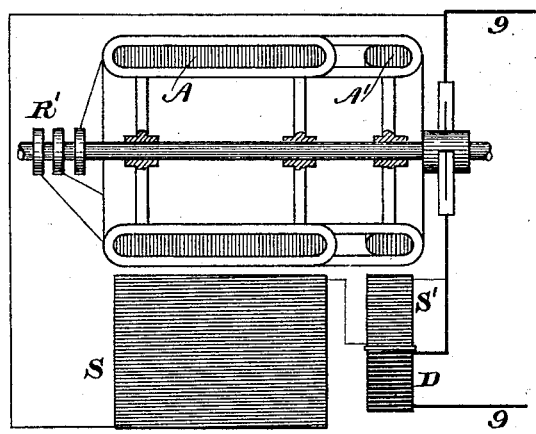
WITNESSES
A. F. Macdonald
A. C. Crane
INVENTOR
Elihu Thomson
By Bentley & Knight
Attys

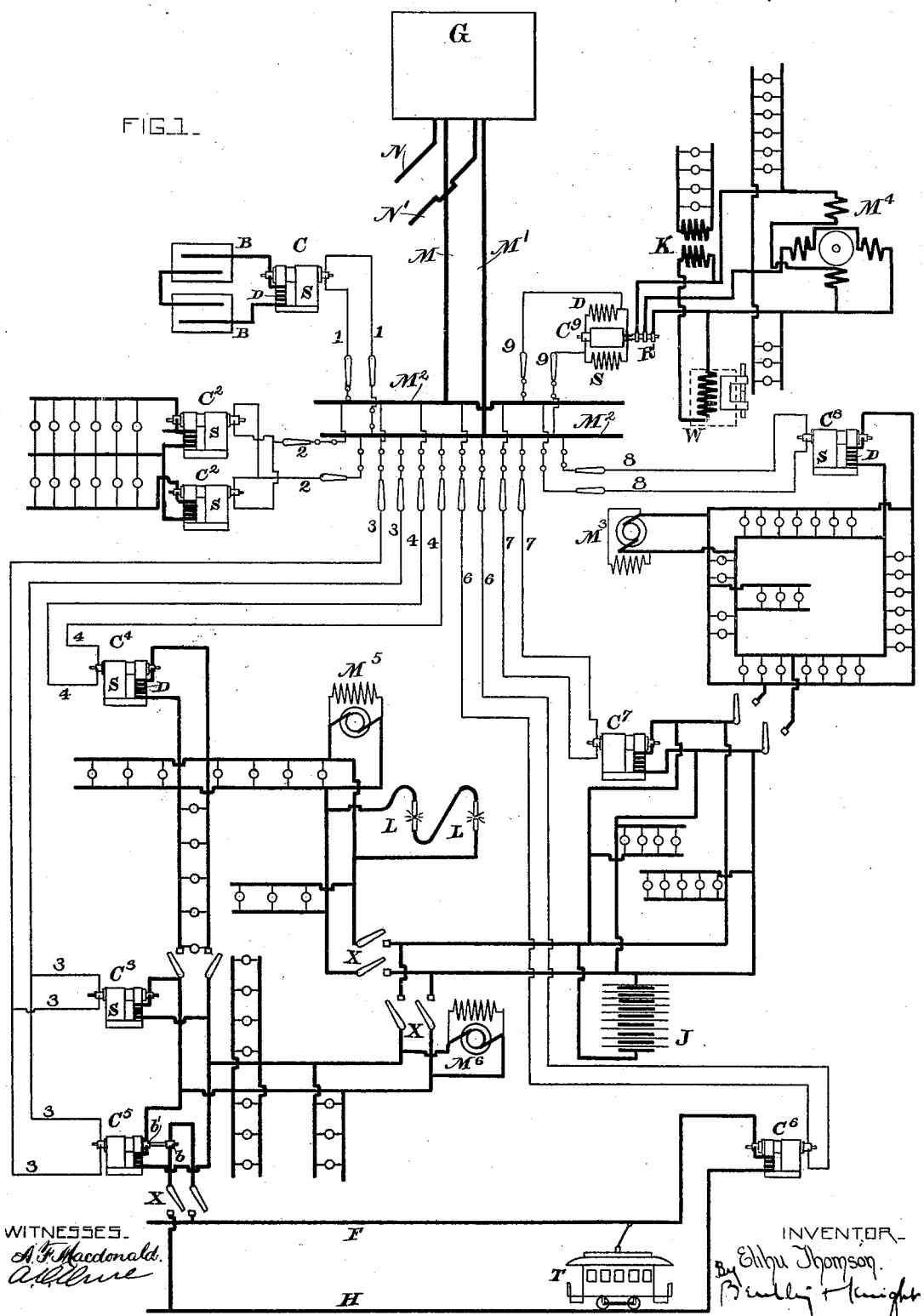

UNITED STATES PATENT OFFICE.

ELIHU THOMSON, OF SWAMPSCOTT, MASSACHUSETTS, ASSIGNOR TO THE THOMSON-HOUSTON ELECTRIC COMPANY, OF CONNECTICUT.

SYSTEM OF ELECTRICAL DISTRIBUTION.

SPECIFICATION forming part of Letters Patent No. 508,646, dated November 14, 1893.

Application filed December 19, 1890. Serial No. 375,198. (No model.)

*To all whom it may concern:*

Be it known that I, ELIHU THOMSON, a citizen of the United States, residing at Swampscott, county of Essex, and State of Massachusetts, have invented a certain new and useful Improvement in Electric Distribution, of which the following is a specification.

My present invention relates to a system of electric distribution, whereby an extended area may be supplied with electric currents of different voltages, and under regulation as to potential. The system comprises a generating station which may be conveniently located at a distance from the district where the supply is to be used, as for instance near a river or water power, or at any point where the expense for fuel and other essentials would be small as compared with their cost in a city. From this generating station is run out a system of mains which are kept by the dynamos at a potential depending on the distance to the main distributing point, the generators at the station being compounded to secure a constant potential at this latter distributing point. From the distributing point branch mains of smaller diameter or section are run (though not necessarily of smaller section) to other points more or less distant covering areas or subdivisions of the district in which the power is to be applied for lighting, the generation of mechanical power by electric motors, &c. The system includes a general system of supply for all purposes for which current may be demanded, and involves the idea of starting out from the generating station with a high potential, and then lowering the potential so that it may be used for giving to the local lines current at a much reduced potential, thereby saving metal in carrying the current. The system employs for this reduction of potential a continuous current transformer constructed according to an invention for which Letters Patent No. 459,423 were granted to me September 15, 1891. These continuous current transformers or converters are compounded so that under a small load they may have a different strength of magnetic field from what they have under full load, the principle being a differentiation of the magnetic field influencing one of the armature windings whereby the relation between the effective lengths of the different windings becomes virtually changed proportionally to the load as this comes on, and the changed relation of the field gives a higher potential to the armature winding supplying the local mains sufficient to compensate for loss in it and in the machine as well as in the feeding line leading to the transformer, thus compensating for all the drop which may occur in the sub-circuit leading from the common distributing point to the lights or other devices.

Reference to the drawings accompanying the present description will explain the nature of my invention, in which—

Figure 1 illustrates diagrammatically the general distribution system and Figs. 1, 2, 3, 4, and 5 show the construction and one mode of applying the transforming generators.

At G in Fig. 1 is a generating station which contains a number of dynamos from which mains M, M', N, N', &c., are run to the district to be supplied. Taking for example the mains M, M', they pass from the central station to a distance, which may be more or less great according to circumstances, and terminate in a set of distributing mains or omnibus wires $M^2$, $M^2$, from which the local circuits are fed. The mains M, M', deliver a comparatively constant potential at the point of distribution $M^2$, $M^2$, and for this purpose the generators at the station will be compounded to give a constant potential under varying loads.

From $M^2$, $M^2$, sub-mains preferably of smaller gage are run out to transformers which lower the potential according to the nature of the work to be done, and are located in the neighborhood of the local work circuits at varying distances from the disttribuing point. At C is shown one of these converters fed by mains 1 1 extending from the mains $M^2$, $M^2$. This converter consists as is more particularly described in connection with Figs. 2, 4 and 5 of an armature having two windings, one of which is affected by a field S dependent upon a shunt taken around the mains 1 1 or around the local mains as preferred, while the other winding is affected both by this shunt and by an accessory field D which is influenced by a direct winding in the circuit of submains 1 1 or the local mains B, B, where the lower potential currents are supposed to be heavy and feeding a plating bath in series. The details of these converters C need not here be set forth, as they do not form the subject of this invention but of that contained in my former application. Suffice it to say that the drop on line 1 1, the drop in machine C itself, and the drop in the local mains leading from it to the baths are taken care of by the construction and winding of the converter. Another branch taken from mains $M^2 M^2$, and designated by the figures 2 2, is led to a set of machines $C^2 C^2$, which are coupled together in such a way as to feed a three wire circuit shown in heavy lines to the left. The machines have the same character as before and are coupled as though they were two generators or sources of electric power. On the circuit of these machines may be run motors or lamps in multiple arc or series, and a compensation for drop on the line 2 2, which may extend to a considerable distance, will be obtained while the drop in $C^2 C^2$ and on the lines feeding directly the local circuits is at the same time taken care of by the machines $C^2 C^2$. It is evident that this three wire system shown as fed by two branch lines might be extended to include other transformers, and the circuits to the local lines fed thereby might be interconnected so as to form an extended network in accordance with principles perfectly well known. In fact the three wire system might be applied to the rest of the arrangements which I am to describe in connection with the other lines leading from the distributing point.

The branch lines 3 3 are led to a considerable distance, and feed machines $C^3 C^5$ compounded for loss during heavy load, and delivering the transformed current to a number of local circuits which are represented by the heavy black lines. These local or secondary circuits include a lighting district in a city, and are provided with switches as at X, X rendering interconnection possible, while in case a machine on one circuit breaks down the circuit adjoining may be caused to feed into the district which has thus been deprived of its source of current. The line 4 4 in like manner feeds into a machine $C^4$ which delivers current over its secondary circuit to street lamps or other devices placed in the district. A motor $M^5$ is shown as fed indirectly from local lines connected to the machine $C^3$ which can as before stated be switched into the circuit so as to interconnect with other like machines, care being taken that the polarities are arranged so that they may be coupled properly, positive to positive and negative to negative, respectively. Arc lights as at L, L may be operated upon these circuits. The machine $C^5$ is peculiar in the respect that it not only feeds the local lights but also a circuit which goes to a railway trolley line F. This latter circuit will naturally be of higher potential than the lighting line, and requires a separate winding on the armature. One of these windings which might be called the "motor winding" is fed by the line 3 3 and the power generated drives the other windings in the magnetic field of the machine, which deliver at their respective commutators and the lines connected therewith, currents of a desired difference of potential depending on the number of turns in the respective windings. The railway line is fed from commutator $b$ and the second commutator $b'$ together with machine $C^3$ supply the interconnected local lines on which are shown lamps and a motor $M^6$, the figure being simply typical of an arrangement which might be extended to include the most complicated system of electric supply.

The lines 6 6 are shown carried to a machine $C^6$ for reducing the potential taken from the mains $M^2 M^2$ while compounding for the drop and delivering current to a railway line F and its return H, the car T being operated by the current passing from one to the other of these lines.

The line 7 7 is carried to the machine $C^7$ which also transforms the currents down to a lower potential for working lights and possibly also for charging batteries, as at J. These batteries of course can be placed in any location within the whole district and be used as sources of reserve power in case of a break-down. The branch lines 8 8 are shown as feeding the machine $C^8$ which acts as do the other machines to transform the current to a lower potential, and deliver it to the locals of an interconnected network or system for house or street supply. The motor $M^3$ is shown connected to this circuit, and the circuit arrangements are as in the other cases only typical of an extended multiple arc system of distribution, the branches from such circuit being carried to lights, motors, baths, or other translating or energy using devices such as are used in electric systems.

The line 9 9 is shown connected to a special machine $C^9$ which has properties different from the others. This machine takes into its armature by one winding connected to a commutator, a direct current leading from 9 9 and changes it into a current alternating in character, as will be presently described in connection with Figs. 2, 3, 4, and 5 where its construction is further shown. Suffice it to say that it takes current from the branch lines 9 9 through a direct field coil D and also a shunt field coil S both of which act on the armature. A commutator connected to the line 9 takes of course continuous current and passes it through an armature bobbin in the ordinary way, but the armature is also provided with other windings which may be one or two in number. In this case two are shown which are placed at positions alternating on the core and parallel to the direct current winding. The terminals from the alternating circuits may be carried to four rings or, preferably, one ring may be dispensed with and the connections be made to three rings, as shown. The alternating currents carried off in this manner by the rings, if the windings be properly made, will vary in phase, one of the circuits being behind the other a certain portion of a wave length depending on the positions of the windings. These may be selected to give a variation of a quarter of a wave, and the currents will bear a relation to each other suitable for certain purposes, such as running a motor at $M^4$ on the "Tesla" principle as it is sometimes called, or a motor in which a field is divided into two sections one of which receives current immediately preceding the reception of current by the other, and causes thereby a traveling field to act upon the armature placed between the field poles. Other branches from the same mains may operate lights, as shown, or other devices using alternating currents. One or more of them may operate transformers as at K for changing the potential of the alternating current to what is required for other purposes, and at W is exemplified the operation of a welding transformer or the electric working of metal where the change of potential is extreme. While the secondary circuits in the figures are shown of the same gage by heavy black lines, it will of course be understood that the wiring will be done in accordance with the load to be carried by the wires, and that where the load is light the wiring would naturally be tapered down in size.

In the branch lines 1 1, 2 2, &c., of course switches, and fusible cut-outs or magnetic cut-outs may be provided to obviate the effects of short-circuits, or to cut off any particular line whenever there is need for stopping the flow of current to the apparatus fed thereby.

One peculiarity of the machine $C^9$, is that a self-regulation or compounding action is obtained which enables the machine to maintain the potential on the secondary lines notwithstanding variations in the load. To exemplify the construction which gives this result reference is made to Figs. 2, 3, 4, and 5. In Fig. 2 the line 9 9 is led to a commutator which is connected with the continuous current winding O upon armature A, "Gramme" or "Siemens." Added to or adjoining this armature is an additional or accessory armature core A' upon which a winding R is placed which also passes over the core A. This second winding, called the "alternate current" winding, may of course be placed in any desired relation overlying, or along side of the continuous current winding upon A. It is arranged to give alternating current impulses and deliver them to the insulated rings at R' according to the number of coils and their arrangement on the core. While this latter winding may be variously modified, it is of course preferable that the currents provided therein should bear some definite relation to each other as thereby their capacity for work is increased. If the field magnet system in which the armature revolves is bipolar then the winding may be arranged as in Fig. 3, that is divided into coils or sections $g\,g$ and $h\,h$ which work separately, the sections $g\,g$ being synchronous in phase and therefore acting together, and the sections $h\,h$ being out of phase and in a little different position or lagging a quarter of a wave length from the positions of the waves in $g\,g$. By carrying the connections outward we may have a three wire system and branches may be taken from it to an alternating current motor $M^4$ in which the principle of phase difference is utilized to produce a traveling field. Fig. 4 shows the relation of the field magnet windings to the other parts. The armature with its windings, would be placed in a field which is divided into two sections P, P'. The main field, P affecting one of the windings say the continuous current winding O, is energized by a shunt S across the continuous current feeders 9 9, and the accessory field P' is energized partly by a coil S' in the shunt, and partly by a coil D in the direct circuit which leads from one of the wires 9 through the commutator. If now a difference of load takes place, say an increase of load, the windings will be made such that the effective length of the continuous current winding is changed in relation to the alternating current winding in such manner as to increase the potential of the alternating current circuit, and therefore compound them for load or even over-compound them for drop of potential as well on the mains 9 9 and the machine itself, as on the local wires fed by the alternating current. This result is gained, with the construction in Figs. 2 and 4, by causing the direct winding when loaded with current to act upon the accessory field pole P' so as to virtually increase the effectiveness of the alternating winding whereby its potential is elevated and its effective length practically increased. Hence at the start or under no load the effect of the coil S' would be to produce polarity in the pole piece P' opposite to that in the corresponding pole piece at P, and the effect of the direct winding D as the load comes on would be to obliterate the polarity in P' due to the winding S', and in fact reverse it so as to cause the pole piece P' to be an assisting pole or a pole of like polarity on the same side of the armature as the pole P. As, however, the pole P' affects only the alternating current winding this is equivalent to lengthening it or increasing the potential of the alternating circuit.

It is not by any means essential to the action that the continuous current winding should be the winding standing by itself as it were, upon the armature core A, but it could be passed around both cores A, A' as in Fig. 5, and connected as before. In this case the alternating winding would be restricted to the core A and would not pass over the accessory core A'. The shunt winding S on the field magnet P therefore affects the alternate winding alone, while this winding and that on the accessory pole P' would both affect the continuous current winding. The only difference between this latter modification and that already described in Figs. 2 and 4 is that in Fig. 5 the polarities of the field P, P' would be the same in name at the start under no load, and as the load comes on the accessory field pole P' would be reversed so as to be of opposite polarity on the same side of the armature as the pole P, thereby in effect shortening the direct current winding and securing the same desired self-regulation as before.

What I claim as new, and desire to secure by Letters Patent, is—

1. The combination in an electric distributing system, of a common distributing main or mains kept at a constant and comparatively high potential with sub-mains leading to work circuits at varying distances from the distributing part, and intermediate self-regulating and self-compensating converters transforming from high to low potential, and adapted to compensate for the drop of potential on the sub-mains as well as in the converters themselves and the working circuits, in accordance with the load thereon, as set forth.

2. The combination in an electric distribution system, of supply mains leading from a generator or generators at a power station to a common distributing point, the drop of potential on which is compensated at the generators by suitable means of regulation; with sub-mains and tension reducing converters feeding work circuits of varying loads and at varying distances from the distributing point, the said converters comprising separate windings connected to the sub-mains and work circuits, and means for automatically varying the relative strength of the fields affecting such windings, in keeping with the load on the work circuits, and thereby compensating for the drop of potential on the said mains as well as in the converters and working circuits.

3. The combination in an electric distribution system, of a distributing main or mains preserved at a comparatively high and constant potential with sub-mains leading to the working circuits, and converters intermediate between the sub-mains and working circuits comprising separate motor and generator windings connected respectively to the sub-mains and working circuits and a coil the current through which varies in response to the load on the work circuit and automatically preserves the relation between the motor and generator windings such as to compensate for drop in potential both on the sub-mains and converters as well as on the working circuits.

4. A transforming generator comprising a winding fed with a continuous current, an alternating current winding generating and delivering an alternating current into a working circuit, and windings upon the field-magnets one of which is controlled by the direct current and is responsive to changes of load to maintain a constant potential in the work circuit or one increasing slightly under load, as set forth.

5. A transforming generator comprising an armature revolving in a field of force, having a winding fed with a continuous current and a second winding delivering alternating currents into a working circuit, and field-magnet windings adapted to automatically alter the relations between the effective lengths of the direct and alternating windings in accordance with the load on the working circuit, as set forth.

6. In a transforming generator the combination of an armature revolving in a magnetic field, having a winding fed with a continuous current, and a second winding delivering an alternating current into a work circuit, and field-magnet windings automatically differentiating the relative strength of the parts of the field which influence the direct and alternating current windings respectively in accordance with the load on the working circuit.

7. In a transforming generator the combination of an armature having a winding fed with a continuous current, and a second winding delivering an alternating current to a work circuit; with a field magnet system in which said coils revolve, part of which is wound with a compound winding differentiating the relative strength of those parts of the field in which the respective windings revolve, in accordance with the load on the working circuit.

8. In a transforming generator the combination of an armature having direct and alternate current windings, as set forth, with a field magnet system energized primarily by a shunt across the direct current mains, and a coil included directly in the said mains which differentiates the relative strength of those parts of the field which influence the respective armature windings in keeping with the load on the work circuit, as set forth.

9. In a transforming generator the combination of main and accessory fields, with an armature having corresponding main and accessory cores, separate windings on the armature by which a continuous feeding current is transformed into an alternating working current, one winding being influenced by the main field, and the other by the main plus the accessory field, and means for varying the strength of the accessory field responsive to and in accordance with changes of load on the work circuit, as set forth.

10. In a transformer the combination of an armature having a winding fed with a direct current and a separate winding delivering an alternating current into a work circuit with a field magnet comprising main and accessory portions by which the relative strength of the fields influencing the said windings may be varied, and a coil for effecting such variation of magnetic intensity coupled up in circuit so that the current therein bears a constant relation to the main current, as set forth.

In testimony whereof I have hereto set my hand this 12th day of December, 1890.

ELIHU THOMSON.

Witnesses:
JOHN W. GIBBONEY,
BENJAMIN B. HULL.